Patented May 29, 1951

2,554,543

UNITED STATES PATENT OFFICE 2,554,543

1,2-NAPHTHOQUINONE CONDENSATION PRODUCTS

Norbert Steiger, Nutley, N. J., assignor to Hoffmann-La Roche Inc., Nutley, N. J., a corporation of New Jersey No Drawing. Application February 16, 1950, Serial No. 144,589

6 Claims. (Cl. 260—396)

The present invention relates to new derivatives of 1,2-dihydro-1,2-dioxo-naphthoquinones which can be represented by the following formula:

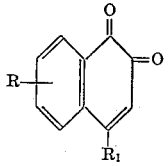

wherein R is a member of the group consisting of hydrogen and a sulfo radical, R₁ is a radical of the group consisting of

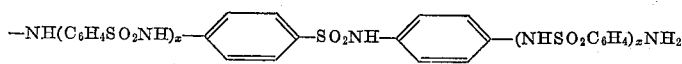

and

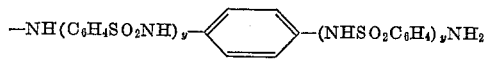

wherein $x$ stands for 0, 1, 2, 3 or 4 and $y$ for 1, 2, 3 or 4; and the salts thereof.

The compounds of Formula I can, in general, be prepared by condensing a 1,2-naphthoquinone-4-sulfonic acid or its alkali salts, i. e., the sodium or potassium salt, with a diamine which can be represented by one of the following formulae:

NH₂(C₆H₄SO₂NH)ₓ—⟨⟩—SO₂NH—⟨⟩—(NHSO₂C₆H₄)ₓNH₂ (A)

and

NH₂(C₆H₄SO₂NH)ᵧ—⟨⟩—(NHSO₂C₆H₄)ᵧNH₂ (B)

wherein $x$ and $y$ have the same significance as already assigned thereto.

The condensation reaction is generally carried out in an aqueous medium, the diamines being dissolved in an alkaline solution, such as aqueous sodium hydroxide or sodium carbonate, and the resulting solution being added to an aqueous suspension or solution of the 1,2-naphthoquinone-sulfonic acid or salt thereof, while stirring or agitating. The temperature of the reaction may be varied over a wide range, for example, from about 15 to 60° C. The reaction is usually complete in about 3-4 hours. When a 1,2-naphthoquinone-disulfonic acid is employed which contains one of its sulfo groups in the 4-position, or salt thereof, then the compounds of Formula I contain a sulfo group; that is, R in Formula I is a sulfo radical. Such compounds are generally soluble in water, whereas those which do not contain a sulfo group are generally insoluble in water. Compounds of the invention are of interest for their chemotherapeutic properties, more particularly as amebicidal and antiviral agents.

The diamine of Formula A where $x$ is 0 is a known compound; namely, 4'-aminosulfanilanilide. Where $x$ is 1, 2, 3 and 4 or higher, the diamines are new compounds, and can be prepared as illustrated by the following equation, which demonstrates the preparation of the diamine where $x$ is 1.

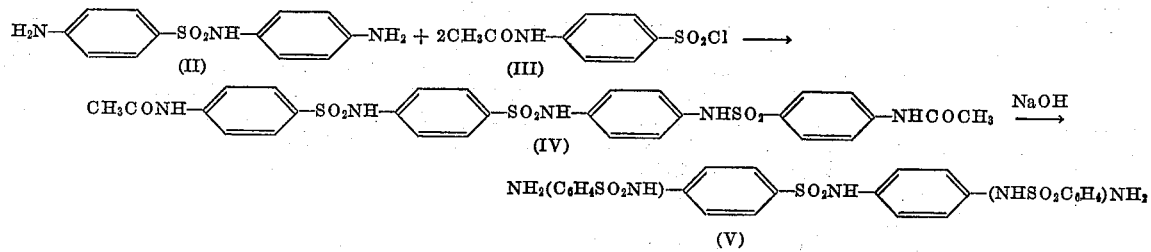

4'-aminosulfanilanilide II is reacted with two moles of N-acetylsulfanilyl chloride (III, which will hereinafter be referred to for brevity's sake as ASC) to form p,p'-bis-(p-acetoamidophenylsulfonamido)benzenesulfonanilide IV, which is then hydrolyzed with sodium hydroxide to form p,p'-bis - (p - aminophenylsulfonamido)benzenesulfonanilide V, which will hereinafter be referred to as Tri.

By repeating the process on Tri with two moles of ASC, there is obtained p,p'-bis-[p-(p-aminophenylsulfonamido)phenylsulfonamido]benzenesulfonanilide, the compound where $x$ in Formula A is 2, which will herein be referred to as Penta.

By repeating the process on Penta with two moles of ASC, there is obtained p,p'-bis-{p[p-(p - aminophenylsulfonamido) phenylsulfonamido]phenylsulfonamido}benzenesulfonanilide, the compound where $x$ in Formula A is 3, which will herein be referred to as Hepta.

By repeating the process on Hepta with two moles of ASC, there is obtained p,p'-bis-(p-{p-[p-

(p - aminophenylsulfonamido)phenylsulfonamido]phenylsulfonamido}phenylsulfonamido) benzenesulfonanilide, the compound where $x$ in Formula A is 4, which will hereinafter be referred to as Nona.

It will be appreciated that by further repetition of the process other diamines of Formula A where $x$ is greater than 4, can also be obtained.

The diamine of Formula B where $y$ is 1 is a known compound; namely, $N^1,N^{1'}$-p-phenylene-bis-sulfanilamide. Where $y$ is 2, 3, and 4 or higher the diamines are new compounds and can be prepared as illustrated by the following equation, which demonstrates the preparation of the diamine where $y$ is 2.

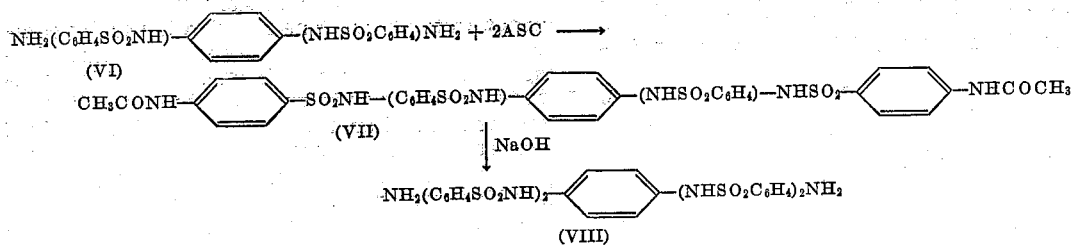

$N^1,N^{1'}$-p-phenylene-bis-sulfanilamide VI is reacted with two moles of ASC to form $N^1,N^{1'}$-p-phenylene - bis - [$N^4$ - (p - acetamidophenylsulfonyl)sulfanilamide] VII which on hydrolysis yields $N^1,N^{1'}$ - p - phenylene - bis - [$N^4$-(p-aminophenylsulfonyl)sulfanilamide] VIII, which will hereinafter be referred to as Tetra.

By repeating the process on Tetra with two moles of ASC, there is obtained $N^1,N^{1'}$-p-phenylene - bis - {$N^4$-[p-(p-aminophenylsulfonamido)-phenylsulfonyl]sulfanilamide}, the compound where $y$ in Formula B is 3, which will hereinafter be referred to as Hexa.

By repeating the process on Hexa with two moles of ASC, there is obtained $N^1,N^{1'}$-p-phenylene - bis - [$N^4$ - {p - (p-[p-aminophenylsulfonamido] phenylsulfonyl) sulfanilamide], the compound where $y$ in Formula B is 4, which will hereinafter be referred to as Octa.

It will be appreciated that by further repetition of the process other diamines of Formula B where $y$ is greater than 4 can be obtained.

The following examples will serve to illustrate the preparation of the diamines of Formula A.

EXAMPLE A

Tri 237 grams of 4'-aminosulfanilanilide and 450 grams of ASC were added in portions alternately to 450 grams of pyridine at below 70° C. The mixture was then heated for 2 hours to 80° C. and the resulting syrupy melt poured into 5 liters of ice water and 325 cc. of concentrated (36.5%) hydrochloric acid. p,p'-Bis-(p-acetamidophenylsulfonamido)benzenesulfonanilide precipitated and was filtered, washed with ice water and sucked dry. The compound was then hydrolyzed with a solution of 160 grams of sodium hydroxide in 1400 cc. of water at reflux for 4 hours. The hydrolyzed product was filtered at 80° C., diluted with 2000 grams of ice and one liter of water, and neutralized with 300 cc. of 36.5% hydrochloric acid. The Tri thus obtained was filtered, washed with ice water and dried. Upon crystallization from methanol-benzene Tri melted at 148° C.

EXAMPLE B

Penta 550 grams of Tri and 475 grams of ASC were added in portions alternately to 700 grams of pyridine below 60° C. and stirred for 3 hours at 80° C. The reaction mixture was then poured into 10 liters of ice water and 500 cc. of 36.5% hydrochloric acid. p,p' - Bis - [p-(p-acetamidophenylsulfonamido) phenylsulfonamido] benzenesulfonanilide precipitated and was filtered, washed with ice water and sucked dry. The compound was hydrolyzed with a solution of 200 grams of sodium hydroxide in 1600 cc. of water by refluxing for 4 hours. The hydrolyzed product was filtered and the filtrate neutralized at 15–25° C. with hydrochloric acid. After filtration, washing with water and drying, Penta was obtained as a white powder.

EXAMPLE C

Hepta 670 grams of Penta and 400 grams of ASC were added in portions alternately to 800 grams of pyridine below 60° C. and heated for 3 hours at 80° C. The reaction mixture was then poured in 10 liters of ice water and 500 cc. of 36.5% hydrochloric acid. p,p'-Bis-{p-[p-(p-acetamidophenylsulfonamido) phenylsulfonamido]phenylsulfonamido}-benzenesulfonanilide which formed, was filtered and washed with water and sucked dry. It was hydrolyzed with a solution of 240 grams of sodium hydroxide in 2200 cc. of water at reflux for 4 hours. The hydrolyzed product was filtered and the filtrate was neutralized at 15 to 25° C. with hydrochloric acid. The neutralized product was filtered, washed with water and dried, yielding Hepta as a white powder.

EXAMPLE D

Nona 853 grams of Hepta and 400 grams of ASC were added in portions alternately to 900 grams of pyridine below 60° C. The mixture was then stirred for 3 hours at 80° C., poured into 10 liters of ice and water and neutralized with hydrochloric acid to purple-Congo reaction. p,p'-Bis-(p - {p - [p - (p - acetamidophenylsulfonamido) - phenylsulfonamido] phenylsulfonamido}phenyl - sulfonamido)benzenesulfonanilide thus formed was filtered, washed with water and sucked dry. It was hydrolyzed with a solution made up of 300 grams of sodium hydroxide and 2800 cc. of water at the boil for 5 hours. The hydrolyzed product was filtered at 80° C., the filtrate was neutralized with hydrochloric acid at 20° C., and the neutralized product was filtered, washed with water and dried, yielding Nona as a white powder.

The following examples will serve to illustrate the preparation of diamines of Formula B.

EXAMPLE E

Tetra 118 grams of $N^1,N^{1'}$-p-phenylene-bis-sulfanilamide and 150 grams of ASC were added in portions alternately to 400 grams of pyridine below 40° C. and the mixture heated for 1 hour with agitation at 70° C., then poured into a solution of 5000 cc. of ice water and 350 cc. of 36.5% hydrochloric acid. N¹,N¹'-p-phenylene - bis - [N⁴-(p-acetamidophenylsulfonyl) sulfanilamide] which precipitated was filtered, washed with water and sucked dry. The compound was hydrolyzed with a solution made up of 100 grams of sodium hydroxide and 800 cc. of water at 100° C. for 4 hours. 10 grams of charcoal and 10 grams of a filter aid were added at 80° C. and the solution was filtered. The filtrate was neutralized with hydrochloric acid at 20-25° C. After drying, Tetra was obtained as a white powder, M. P. 220° C.

EXAMPLE F

Hexa 110 grams of Tetra and 90 grams of ASC were added in portions alternately to 300 cc. of pyridine below 40° C. and the reaction mixture then heated to 70° C. for 3 hours. It was then poured into a solution made up of 3000 cc. of ice water and 300 cc. of 36.5% hydrochloric acid. N¹,N¹'-p-phenylene - bis - {N⁴-[p-(p-acetamidophenyl-sulfonamido) phenyl-sulfonyl]sulfanilamide} precipitated and was filtered, washed with water and sucked dry. The compound was hydrolyzed with a solution made up of 100 grams of sodium hydroxide and 900 cc. of water at 100° C. for 4 hours. The hydrolyzed product was filtered hot and the filtrate neutralized with hydrochloric acid whereupon Hexa precipitated in crystalline form. When crystallized from methanol-benzene, Hexa melted at 227° C. with decomposition.

EXAMPLE G

Octa 93 grams of Hexa and 70 grams of ASC were added in portions alternately to 300 cc. of pyridine below 60° C. The reaction medium was then heated for 3 hours at 70-80° C. and then poured into a solution made up of 4000 cc. of ice water and 300 cc. of 36.5% hydrochloric acid. N¹,N¹'-p-phenylene-bis-[N⁴-{p-(p-[p-acetamidophenyl-sulfonamido]phenylsulfonamido) phenylsulfonyl} sulfanilamide] precipitated as a white sandy powder. The compound was filtered, washed with water and sucked dry. It was heated to the boil for 4 hours with 1000 cc. of a 10% sodium hydroxide solution. The hydrolyzed product was filtered hot and neutralized with hydrochloric acid at 20-25° C. Octa precipitated. It was filtered, washed with cold water and dried, whereupon it was obtained as a white powder.

The following examples will serve to illustrate the preparation of the compounds of Formula I.

EXAMPLE 1

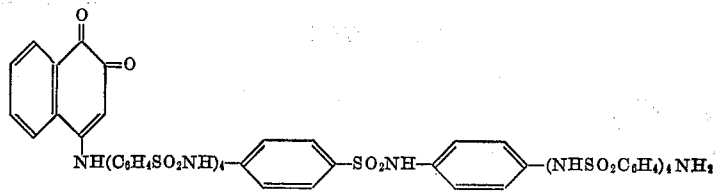

46 grams of Nona were dissolved in a solution made up of 26 cc. of a 40% sodium hydroxide solution and 200 cc. of water at 70° C. and the solution filtered. The filtrate was dropped into a solution of 30 grams of 1,2-naphthoquinone-4-potassium sulfonate in 800 cc. of water and 10 cc. of acetic acid at room temperature with agitation. The stirring was continued for 6 hours. The precipitate which formed was filtered by suction and washed with 2 liters of water, sucked dry and then dried at 80° C., yielding the compound of the above formula. The compound is of pinkish color, insoluble in water but soluble in hot 80% ethanol. It is soluble in dilute sodium hydroxide, giving an orange-brown solution.

EXAMPLE 2

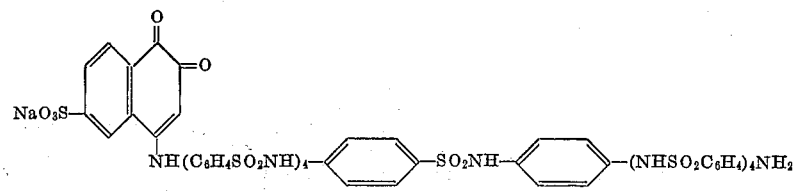

22.5 grams of Nona were dissolved in a solution made up of 200 cc. of water and 8 grams of sodium carbonate at 90° C. and the solution was filtered hot. The filtrate was dropped into a solution of 20 grams of 1,2-naphthoquinone-4,6-di-potassium disulfonate in 300 cc. of water. After stirring for 30 minutes there were added 10 cc. of hydrogen peroxide (30%). After further stirring for 1 hour, 5 grams of sodium carbonate were added and the stirring continued for 6 hours. The condensation product was obtained as a precipitate of slightly reddish color. The precipitate was filtered and washed with ice water, sucked dry and finally dried at 80° C., yielding the compound of the above formula. The compound is of reddish color and is soluble in hot water.

EXAMPLE 3

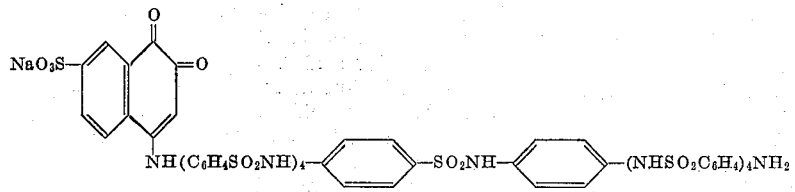

22 grams of Nona were dissolved in a solution made of 250 cc. of water and 8 grams of sodium carbonate at 90° C. and the solution was filtered hot. The filtrate was dropped into a solution of 19 grams of 1,2-naphthoquinone-4,7-dipotassium disulfonate in 300 cc. of water. After stirring for 30 minutes, 10 cc. of hydrogen peroxide (30%) were added. After further stirring for 1 hour, 5 grams of sodium carbonate were added and the stirring continued for 6 hours. A reddish precipitate was obtained which was filtered, washed with water, and then dried at 80° C., yielding the compound of the above formula. The compound is of reddish color and is soluble in hot water.

EXAMPLE 4

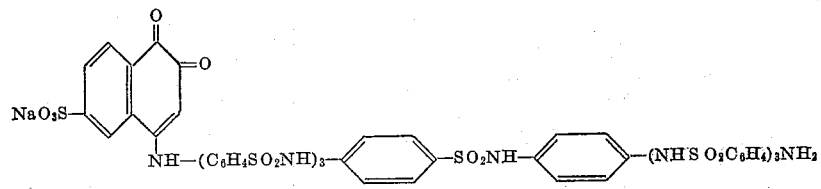

7 grams of Tri were dissolved in a solution made up of 70 cc. of water and 5 cc. of 10 N sodium hydroxide and the resulting solution was dropped into a solution of 12 grams of 1,2-naphthoquinone-4-sodium sulfonate in 300 cc. of water and 4 cc. of glacial acetic acid with good agitation which was continued for 6 hours. The reddish precipitate which formed was filtered, washed and dried, yielding the compound of the above formula. The compound is of reddish color, insoluble in water and soluble in 1 N sodium hydroxide solution.

EXAMPLE 5

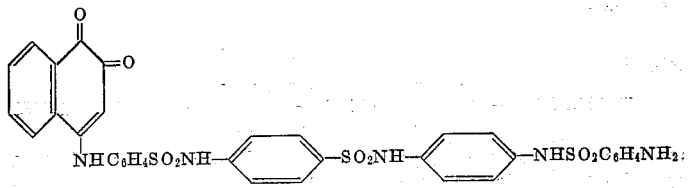

24 grams of Hepta were dissolved in a solution made up of 200 cc. of water and 14 grams of sodium carbonate and the resulting solution poured into a solution made up of 20 grams of 1,2-naphthoquinone-4,6-dipotassium disulfonate, 200 cc. of water and 10 grams of sodium acetate. The reaction medium was agitated for 8 hours at room temperature. The reddish precipitate which formed was filtered and dried, yielding the compound of the above formula. The compound is a reddish powder, soluble in hot water.

EXAMPLE 6

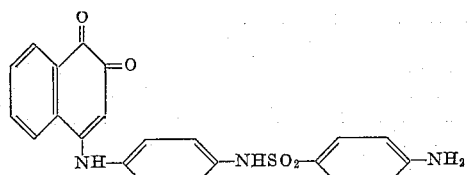

10 grams of 4′-aminosulfanilanilide were dissolved in a solution made up of 5 cc. of 10 N sodium hydroxide and 100 cc. of water and the resulting solution dropped into a solution of 20 grams of 1,2-naphthoquinone-4-sulfonic acid in 400 cc. of water and 5 cc. of acetic acid with good agitation which was continued for 6 hours. The precipitate which formed was filtered, washed and dried, yielding the compound of the above formula. The compound is a red powder insoluble in water and soluble in 1 N sodium hydroxide.

EXAMPLE 7

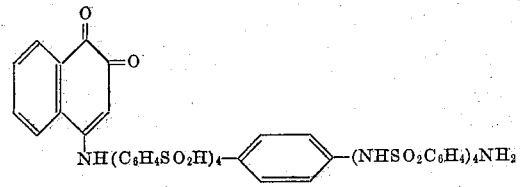

20 grams of Octa were dissolved in a solution made up of 10 cc. of 1 N sodium hydroxide and 150 cc. of water and the resulting solution dropped into a solution of 15 grams of 1,2-naphthoquinone-4-potassium sulfonate, 400 cc. of water, and 8 cc. of glacial acetic acid. The reaction mixture was stirred at room temperature for 8 hours. The precipitate which formed was filtered and dried, yielding the compound of the above formula. The compound was obtained as a pinkish powder insoluble in water but soluble in aqueous sodium hydroxide solution.

EXAMPLE 8

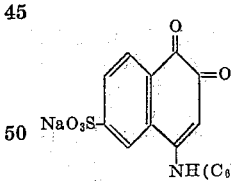

20 grams of Octa were dissolved in a solution made up of 10 cc. of 10 N sodium hydroxide and 100 cc. of water and the resulting solution dropped into a solution made up of 20 grams of 1,2-naphthoquinone-4,6-dipotassium disulfonate, 300 cc. of water, and 8 cc. of glacial acetic acid. The mixture was then stirred at room temperature for 8 hours. The precipitate which formed was filtered and dried, yielding the compound of the above formula. The compound is a red powder and is soluble in hot water.

EXAMPLE 9

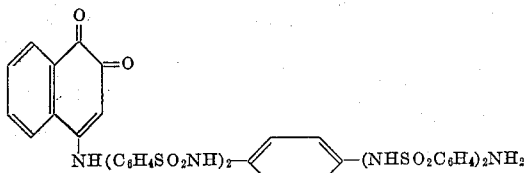

14 grams of Tetra were dissolved in a solution made up of 10 cc. of 10 N sodium hydroxide and 100 cc. of water. The resulting solution was dropped into a solution made up of 15 grams of 1,2-naphthoquinone-4-sodium sulfonate and 6 cc. of glacial acetic acid. The mixture was stirred at room temperature for 8 hours. The precipitate which formed was filtered and dried, yielding the compound of the above formula. The compound is a red powder, insoluble in water, and soluble in aqueous sodium hydroxide.

EXAMPLE 10

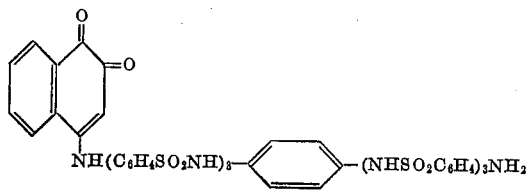

20 grams of Hexa were dissolved in a solution made up of 10 N sodium hydroxide and 150 cc. of water. The resulting solution was added to a solution made up of 20 grams of 1,2-naphthoquinone-4-potassium sulfonate, 400 cc. of water and 6 cc. of acetic acid. The reaction mixture was stirred at room temperature for 8 hours. The precipitate which formed was filtered and dried, yielding the compound of the above formula. The compound is a red powder and is insoluble in water.

I claim:

1. A compound which can be represented by the following formula:

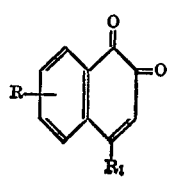

R being a member of the group consisting of hydrogen and a sulfo radical, and $R_1$ being a radical of the group consisting of

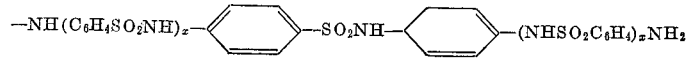

and

—NH(C$_6$H$_4$SO$_2$NH)$_y$—⟨⟩—(NHSO$_2$C$_6$H$_4$)$_y$NH$_2$ $x$ being a member of the group consisting of 0, 1, 2, 3 and 4 and $y$ being a member of the group consisting of 1, 2, 3 and 4, and the salts thereof.

2. The compound which can be represented by the following formula:

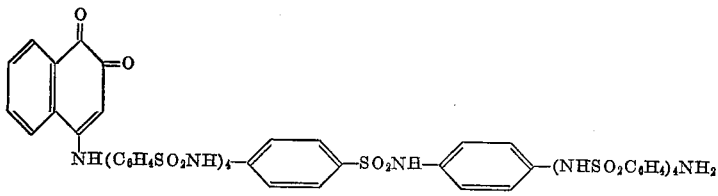

3. The compound which can be represented by the following formula:

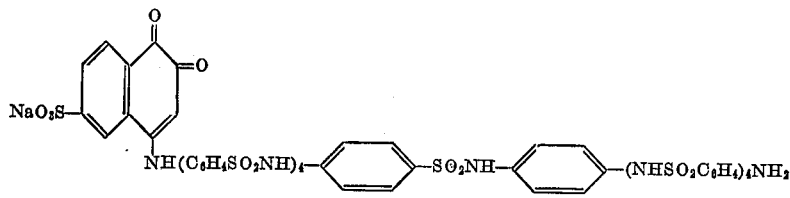

4. The compound which can be represented by the following formula:

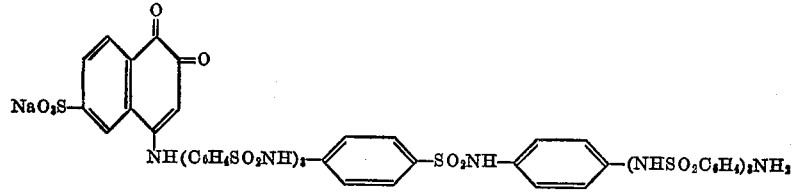

5. The compound which can be represented by the following formula:

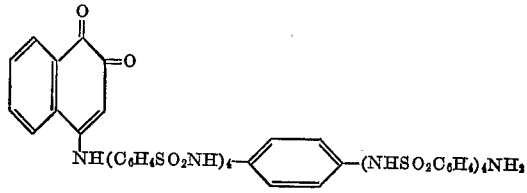

6. The compound which can be represented by the following formula:

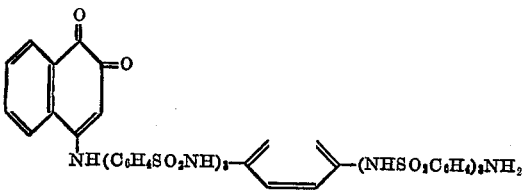

NORBERT STEIGER.

No references cited.